United States Patent
Jang

(10) Patent No.: US 11,855,321 B2
(45) Date of Patent: Dec. 26, 2023

(54) METHOD OF CONTROLLING HYDROGEN PARTIAL PRESSURE FOR FUEL CELL SYSTEM

(71) Applicants: Hyundai Motor Company, Seoul (KR); Kia Motors Corporation, Seoul (KR)

(72) Inventor: Sang Eun Jang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 400 days.

(21) Appl. No.: 16/055,477

(22) Filed: Aug. 6, 2018

(65) Prior Publication Data
US 2019/0207235 A1    Jul. 4, 2019

(30) Foreign Application Priority Data
Dec. 29, 2017  (KR) ........................ 10-2017-0183876

(51) Int. Cl.
*H01M 8/04746* (2016.01)
*H01M 8/22* (2006.01)
(Continued)

(52) U.S. Cl.
CPC ... *H01M 8/04753* (2013.01); *H01M 8/04197* (2016.02); *H01M 8/04231* (2013.01);
(Continued)

(58) Field of Classification Search
CPC ......... H01M 8/04197; H01M 8/04365; H01M 8/04447; H01M 8/04589; H01M 8/04753; H01M 8/04798; H01M 8/222
See application file for complete search history.

(56) References Cited

U.S. PATENT DOCUMENTS

2012/0028152 A1* 2/2012 Harris ............... H01M 8/04447
                                                            429/432
2015/0295255 A1* 10/2015 Bae .................. H01M 8/04231
                                                            429/446
(Continued)

FOREIGN PATENT DOCUMENTS

CN        1943065 A      4/2007
CN      102347499 A      2/2012
(Continued)

OTHER PUBLICATIONS

The State of the Art in Fuel Cell Condition Monitoring and Maintenance; Michael Knowles, David Baglee, Adrian Morris, and Qinglian Ren; EVS25, Nov. 2010; World ELectric Vehicle Journal vol. 4 (Year: 2010).*

(Continued)

*Primary Examiner* — Brian R Ohara
*Assistant Examiner* — Brent C Thomas
(74) *Attorney, Agent, or Firm* — Fox Rothschild LLP

(57) ABSTRACT

A method of controlling a hydrogen partial pressure can be carried out in a fuel cell system including a stack having a hydrogen electrode and an air electrode. The method includes: determining a point of time to purge the hydrogen electrode using a hydrogen concentration at an outlet of the hydrogen electrode or an accumulated amount of charge generated in the stack; and setting a target supply pressure of hydrogen supplied to the stack, in which the target hydrogen supply pressure is set in consideration of a hydrogen pressure and a partial pressure of nitrogen resulting from crossover in the stack.

6 Claims, 7 Drawing Sheets

(51) Int. Cl.
  *H01M 8/04791* (2016.01)
  *H01M 8/0432* (2016.01)
  *H01M 8/04223* (2016.01)
  *H01M 8/04082* (2016.01)
  *H01M 8/0444* (2016.01)
  *H01M 8/04537* (2016.01)
  *H01M 8/10* (2016.01)

(52) U.S. Cl.
  CPC ... *H01M 8/04365* (2013.01); *H01M 8/04447* (2013.01); *H01M 8/04589* (2013.01); *H01M 8/04798* (2013.01); *H01M 8/222* (2013.01); *H01M 2008/1095* (2013.01)

(56) References Cited

U.S. PATENT DOCUMENTS

2016/0141905 A1* 5/2016 Yamanaka .......... H01M 8/0488 320/135
2016/0164124 A1* 6/2016 Suh .................. H01M 8/04798 429/411
2016/0190619 A1* 6/2016 Kazuno .................. B60L 58/30 429/428
2017/0047600 A1* 2/2017 Uchida ................. H01M 4/925
2017/0309933 A1 10/2017 Son

FOREIGN PATENT DOCUMENTS

| CN | 104979571 A | 10/2015 |
| JP | 2009-187794 A | 8/2009 |
| JP | 2013-225514 A | 10/2013 |
| KR | 10-2017-0121946 A | 11/2017 |
| KR | 20170121946 A * | 11/2017 |

OTHER PUBLICATIONS

Machine translation of KR 20170121946 A, Sun et al. (Year: 2017).*

* cited by examiner

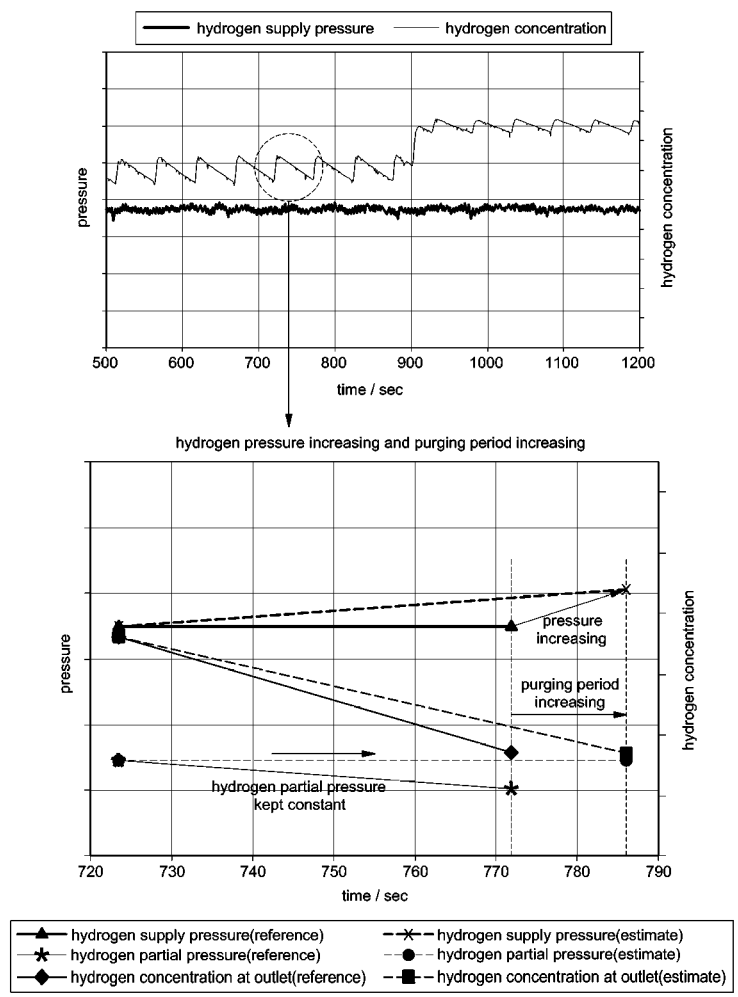

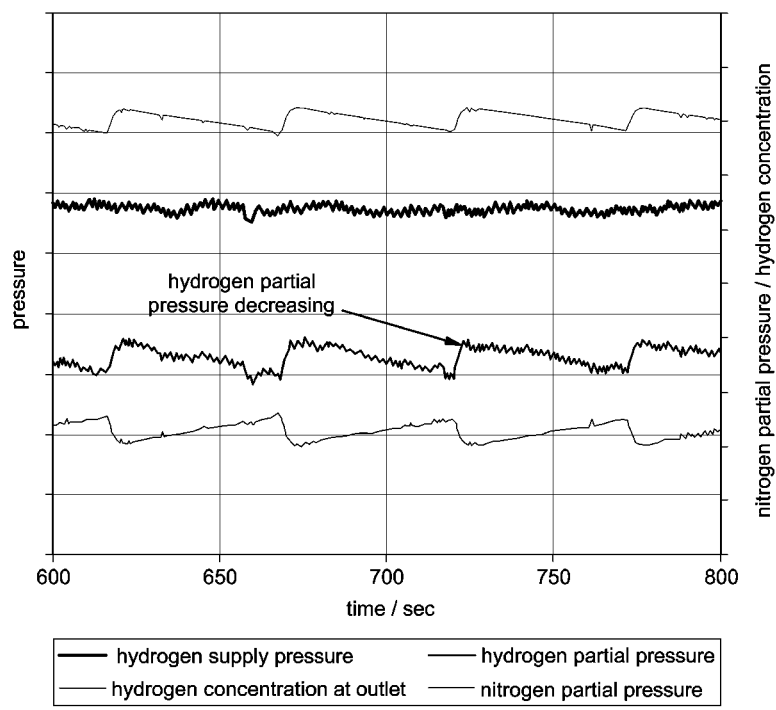

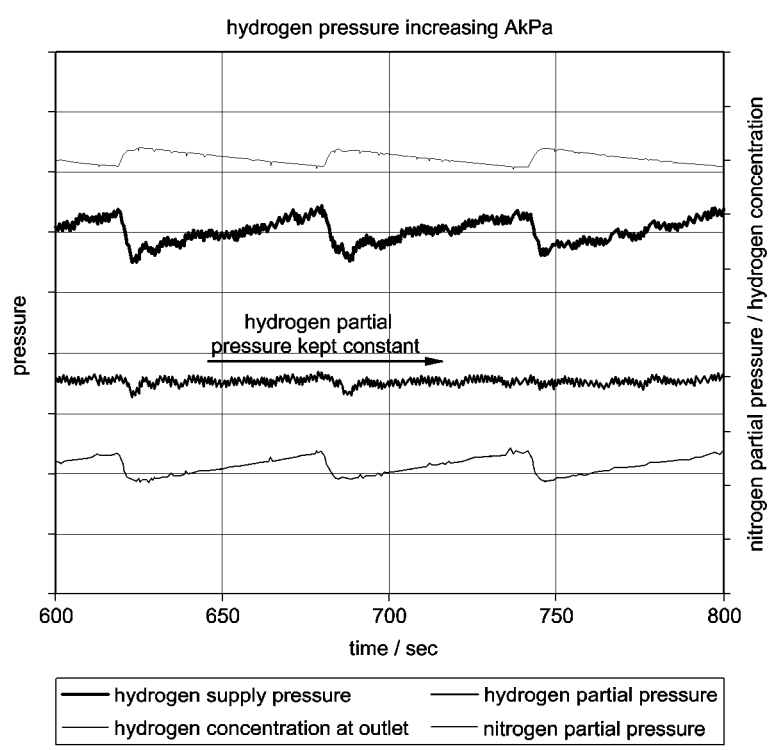

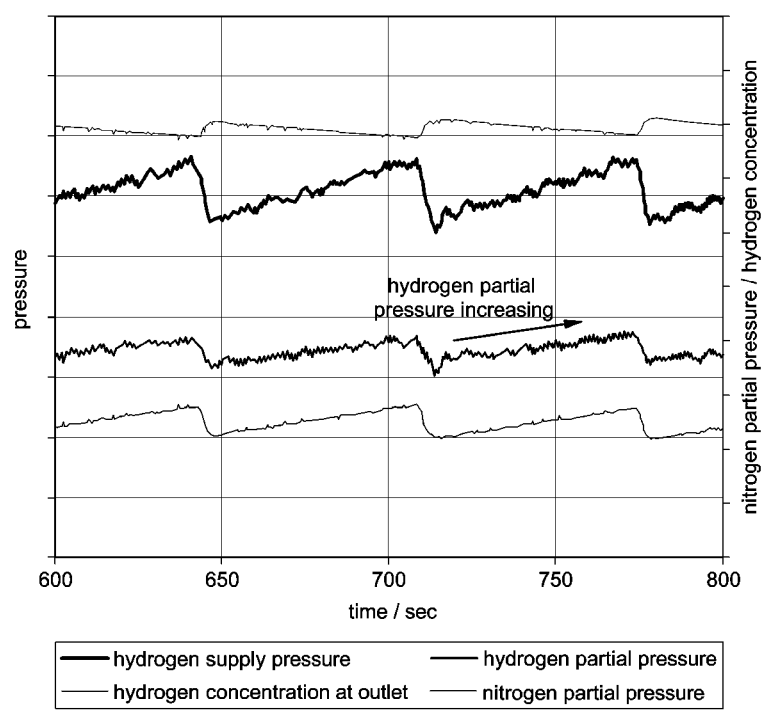

ers, and the like, and the air supplier includes an air blower 31, a humidifier 32, and the like, and the heat and water management system (not shown) includes a electric water pump (coolant pump), a water tank, a radiator, and the like.

METHOD OF CONTROLLING HYDROGEN PARTIAL PRESSURE FOR FUEL CELL SYSTEM

CROSS REFERENCE TO RELATED APPLICATION

This application claims under 35 U.S.C. § 119(a) the benefit of Korean Patent Application No. 10-2017-0183876, filed Dec. 29, 2017, the entire contents of which are incorporated by reference herein.

BACKGROUND

(a) Technical Field

The present disclosure relates generally to a method of controlling a hydrogen partial pressure in a fuel cell stack of a fuel cell system, and more particularly, to a method of controlling a hydrogen partial pressure at a hydrogen electrode in the fuel cell stack that is capable of keeping constant the hydrogen partial pressure at the hydrogen electrode based on a partial pressure of nitrogen resulting from a crossover from an air electrode to the hydrogen electrode, a temperature of the fuel cell stack, operating conditions, and the like.

(b) Description of the Related Art

A fuel cell system is applied to a hydrogen fuel cell vehicle, which is one type of environmental-friendly vehicle. The fuel cell system includes a fuel cell stack for generating electric energy from an electrochemical reaction of a reactive gas (hydrogen as fuel, and oxygen as an oxidant), a hydrogen supplier that supplies hydrogen as fuel to the fuel cell stack, an air supplier that supplies air containing oxygen to the fuel cell stack, a heat and water management system for discharging heat of the fuel cell stack to the outside to control an operation temperature and perform a water management function; and a fuel cell system controller for controlling overall operations of the fuel cell system.

FIG. 1 is a schematic diagram showing a fuel cell system, in which the hydrogen supplier includes a high pressure vessel (hydrogen tank) 21 for storing hydrogen, high pressure/low pressure regulators (not shown), a hydrogen supplier valve 23, a hydrogen re-circulator, and the like, and the air supplier includes an air blower 31, a humidifier 32, and the like, and the heat and water management system (not shown) includes a electric water pump (coolant pump), a water tank, a radiator, and the like.

The high-pressure hydrogen supplied from the hydrogen tank 21 of the hydrogen supplier device is supplied to a fuel cell stack 10 (also referred to herein simply as a "stack") at a low pressure after passing through the high-pressure/low-pressure regulators (not shown) in order, and the hydrogen re-circulator has an ejector 25 and/or a re-circulation blower installed in a recirculation line 24 so that unreacted remaining hydrogen after being used in the hydrogen electrode (fuel electrode, anode) of the fuel cell stack 10 is recycled back to the hydrogen electrode, thereby promoting reuse of the hydrogen.

On the other hand, according to operation of the fuel cell stack 10 in the fuel cell system, nitrogen in air supplied to the air electrode (cathode) and water (water and vapor) generated in the air electrode of the stack moves via a crossover across an electrolyte membrane within the stack and reaches the hydrogen electrode.

At this time, since the nitrogen lowers the partial pressure of hydrogen, thereby lowering performance of the stack, and the generated water blocks a flow path, thereby impeding a flow of hydrogen, it is necessary to secure stable performance of the stack by periodically purging the hydrogen electrode.

In the fuel cell, as an amount of foreign substances such as nitrogen, water, and water vapor passing through the electrolyte membrane within the stack to the hydrogen electrode increases, the amount of hydrogen in the hydrogen electrode decreases, whereby reaction efficiency decreases. Therefore, a hydrogen purge valve 40 is opened at a certain period so that purging is carried out in a rear end of the air electrode.

Specifically, the hydrogen purge valve 40 for purging the hydrogen is installed in an outlet side of the hydrogen electrode of the fuel cell stack 10 so that the gas present in the hydrogen electrode may be periodically discharged, whereby the foreign substances such as water and nitrogen of a separating plate within the fuel cell stack are discharged and removed together, thereby increasing a hydrogen concentration of the hydrogen electrode. Since the foreign substances in the fuel cell stack are discharged, there are advantages in that the hydrogen concentration increases, and gas diffusion degree and reactivity improvements are obtained.

On the other hand, the hydrogen purge valve 40 is an electronic control valve that is to periodically opened/closed in response to a command from a fuel cell system controller (not shown) to control the hydrogen concentration. When the hydrogen purge valve 40 is opened, the foreign substances such as moisture, nitrogen, and the like in the fuel cell stack 10 can be discharged to the atmosphere through the vehicle exhaust port 34.

If the hydrogen purge valve 40 is opened when driving the vehicle, the hydrogen can be discharged via a rear end of the air electrode and an air exhaust line 33, and an exhaust port 33 to the outside together with the foreign substances, due to a pressure difference between the hydrogen electrode (relatively high pressure) and the air electrode in the fuel cell stack 10, thereby keeping constant an output of the fuel cell stack.

SUMMARY

In the case of conventional hydrogen purging, hydrogen gas is periodically purged so that nitrogen gas accumulated at a hydrogen electrode is exhausted to the outside of the fuel cell system, in order to keep constant a hydrogen concentration at the hydrogen electrode. However, a hydrogen partial pressure at the hydrogen electrode is reduced as a concentration of nitrogen resulting from a crossover from an air electrode to the hydrogen electrode increases from one purging event until the next purging event (purging period). Further, the reduced hydrogen partial pressure could have an influence on durability of the entire fuel cell system including the stack. Accordingly, an object of the present disclosure is to provide a method of controlling a hydrogen partial pressure for the fuel cell system that allows the hydrogen partial pressure to be kept constant at the hydrogen electrode, by keeping constant a target pressure of the hydrogen supplied to the hydrogen electrode, or controlling various control variables such as nitrogen partial pressure, temperature and current of the stack, and the like by variably controlling the target hydrogen pressure, in order to prevent the hydrogen partial pressure from being reduced at the hydrogen electrode during the purging period.

In order to accomplish the above object, the present disclosure provides a method of controlling a stack in a fuel cell system, the stack including a hydrogen electrode and an air electrode, the method including: supplying hydrogen to the stack at a target hydrogen supply pressure; computing a hydrogen concentration at an outlet of the hydrogen electrode or an accumulated amount of electric charge generated in the stack; and updating the target hydrogen supply pressure of the hydrogen supplied to the stack, wherein the updated target hydrogen supply pressure is set in consideration of the target hydrogen supply pressure and a partial pressure of nitrogen resulting from crossover in the stack.

The target hydrogen supply pressure may be set by adding the partial pressure of the nitrogen to a hydrogen pressure in the stack.

The target hydrogen supply pressure may be variably set over time in consideration of a rate of increase in the partial pressure of the nitrogen.

The method may further include: determining to carry out a purge of the hydrogen electrode when the hydrogen concentration at an outlet of the hydrogen electrode exceeds a predetermined hydrogen concentration or the accumulated amount of electric charge generated in the stack exceeds a predetermined target amount of electric charge.

The target hydrogen supply pressure may be set in consideration of the partial pressure of the nitrogen and at least one of temperature of the stack, condition of current required in the fuel cell system, and the hydrogen concentration in the hydrogen electrode.

The hydrogen concentration may be directly measured by a concentration sensor in the stack or determined by using a value estimated via a concentration estimator.

The present disclosure may provide the following effects.

According to the present disclosure, the hydrogen partial pressure at the hydrogen electrode can be kept constant so that the purging period is increased and the number of times when the purge valve is opened is decreased, thereby improving use efficiency of the hydrogen to and the fuel efficiency of the stack.

Further, according to the present disclosure, since the hydrogen partial pressure at the hydrogen electrode is kept constant, the durability of the stack can be improved.

In addition, according to the present disclosure, the target hydrogen supply pressure at the hydrogen electrode is determined by map data based on the operating conditions including a temperature of the stack, current, in addition to the nitrogen partial pressure, whereby it is possible actively control the hydrogen partial pressure at the hydrogen electrode in various driving environments.

BRIEF DESCRIPTION OF THE DRAWINGS

The above and other objects, features and other advantages of the present disclosure will be more clearly understood from the following detailed description when taken in conjunction with the accompanying drawings, in which:

FIG. 4 is a graph showing a change of each pressure when a hydrogen purge is performed multiple times in a fuel cell system; and FIGS. 5 to 7 are graphs showing a change in each hydrogen partial pressure depending on the degree of consideration of the partial pressure of nitrogen resulting from crossover when calculating a target hydrogen supply pressure.

DETAILED DESCRIPTION OF THE DISCLOSURE

Figure 1:
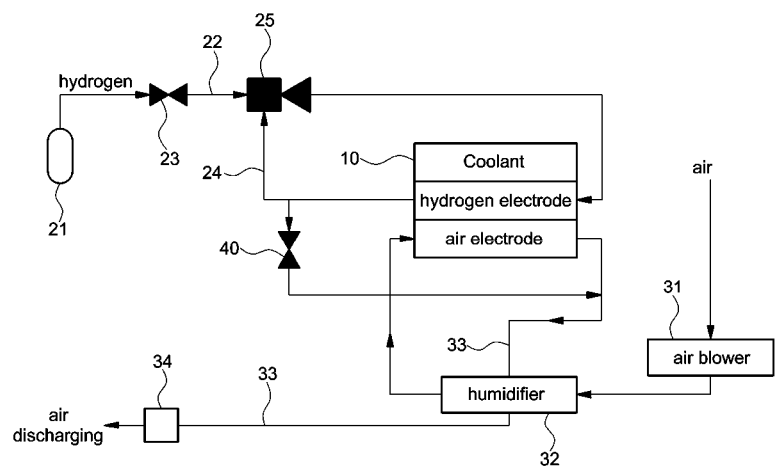
FIG. 1 is a schematic view showing a structure and a connection relationship of a fuel cell system for performing a method of controlling a hydrogen partial pressure according to an embodiment of the present disclosure.

Hereinafter, embodiments of the present disclosure will be described in detail with reference to the accompanying drawings. The embodiments of the present disclosure can be modified in various forms, and the scope of the present disclosure should not be construed as being limited to the following embodiments. This embodiment is provided to more fully explain the present disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A fuel cell system mounted on a vehicle includes a fuel cell stack for generating electrical energy, a fuel supplier for supplying fuel (hydrogen) to the fuel cell stack, an air supplier for supplying, to the fuel cell stack, oxygen in air as an oxidizer that is necessary for electrochemical reaction, a cooling system for removing reaction heat from the fuel cell stack to the outside of the system and controlling operating temperature of the fuel cell stack, and the like.

The fuel supplier of the fuel cell system may have a high-pressure vessel filled with fuel as a fuel storage tank. The high-pressure vessel may preferably be filled with hydrogen as fuel at a high pressure of about 700 bar.

Hydrogen supplied from the high-pressure vessel may flow in the stack. Specifically, the hydrogen inlet of the stack is connected to the high-pressure vessel so that the hydrogen may flow in the hydrogen inlet of the stack. The hydrogen inlet of the stack may be connected to the hydrogen electrode, and as a result, the hydrogen in the high-pressure vessel may be supplied to the hydrogen electrode. Further, the air electrode is connected to the atmosphere, and air containing oxygen may be introduced from the atmosphere through an air blower into the air electrode of the stack.

Therefore, hydrogen in the hydrogen electrode of the stack and oxygen in the air electrode may be in contact with each other, and current may be generated in a membrane electrode assembly (MEA) that may be provided between the hydrogen electrode and the air electrode.

However, as described above, crossover of the gas from the hydrogen electrode to the air electrode in the stack and vice versa may occur, and crossover of the air from the air electrode to the hydrogen electrode may occur due to the pressure difference. Specifically, crossover of nitrogen in the gas constituting the air to the hydrogen electrode may occur.

As the nitrogen accumulates in the hydrogen electrode, the concentration and the partial pressure of the hydrogen at the hydrogen electrode inevitably decrease. Therefore, in order to exhaust nitrogen to the outside, purging may be periodically carried out according to one embodiment of the present disclosure. The purging carried out in the present disclosure may be implemented by opening the purge valve, and the hydrogen purge valve may branch off at one point of the gas exhaust line from the hydrogen electrode and be connected to one point of gas exhaust line from the air electrode. That is, the hydrogen purge valve may be provided to connect a rear end of the hydrogen electrode and a rear end of the air electrode with each other. The hydrogen purging may be carried out in a manner known to those skilled in the art, and detailed description thereof may be omitted.

Figure 2:
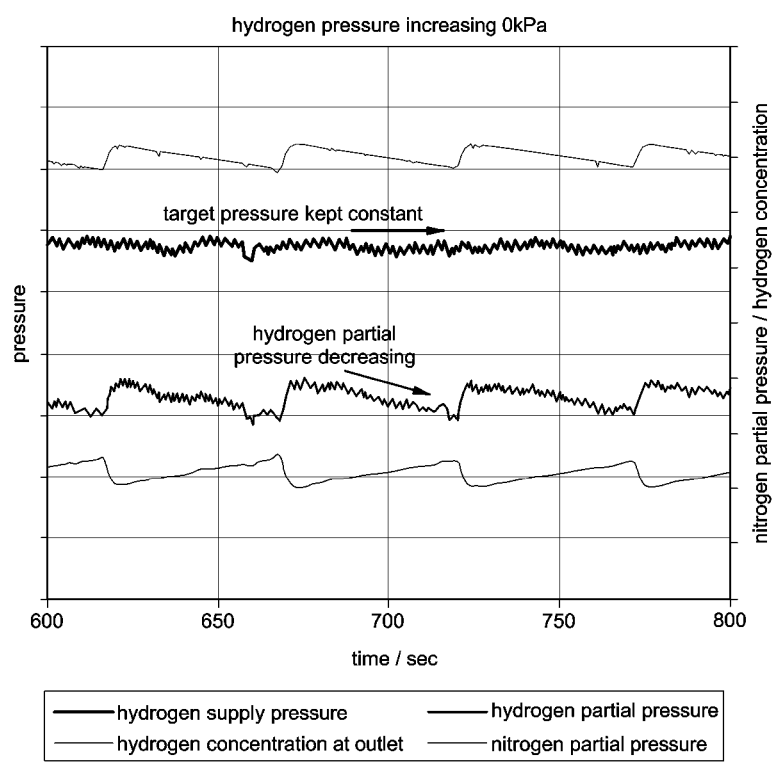
FIG. 2 is a graph showing changes of each pressure and partial pressure when a hydrogen purge is performed according to general method.

FIG. 2 is a diagram showing a typical embodiment of the hydrogen purging. As shown in FIG. 2, it may be appreciated that the target pressure that is to be supplied to the hydrogen electrode is kept constant. Further, when the target pressure supplied to the hydrogen electrode is kept constant, it may be seen that the hydrogen partial pressure decreases when the hydrogen purging is performed.

From the viewpoint of driving the stack, it is important that a concentration (or partial pressure) of hydrogen present in the hydrogen electrode is kept constant. Therefore, according to the present disclosure, a method of controlling a hydrogen partial pressure for a fuel cell system that is capable of keeping constant the hydrogen concentration at the hydrogen electrode with a controller will be described in detail below.

Figure 3:
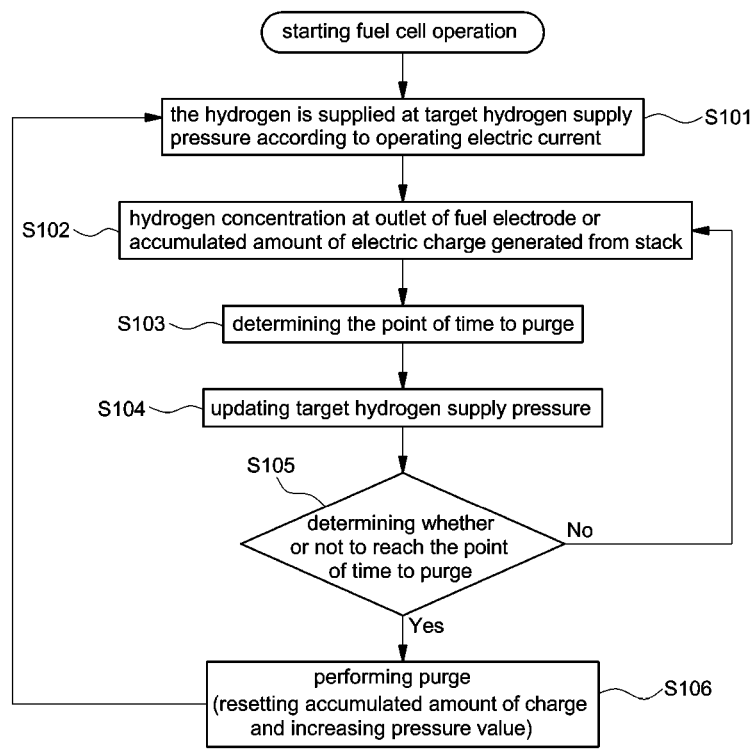
FIG. 3 is a flowchart illustrating the order of a method of controlling a hydrogen partial pressure according to an embodiment of the present disclosure.

FIG. 3 is a flowchart illustrating a method of controlling a hydrogen partial pressure according to an embodiment of the present disclosure.

According to the present disclosure, the start-up of an environmental-friendly vehicle equipped with a fuel cell system may be switched to an 'On' state. When the starting of the vehicle becomes 'On', an operation of the fuel cell may be initiated. That is, the hydrogen and the oxygen react in the stack of the fuel cell to generate electric current.

Thereafter, the controller of the vehicle equipped with the fuel cell system may calculate an amount of electric current that should be generated in the stack including driving system and electric system of the vehicle. Further, an amount of hydrogen to be supplied to the stack may be calculated so as to correspond to the calculated amount of current or power, and the amount of hydrogen may be controlled by adjusting the pressure of hydrogen supplied from the high-pressure vessel to the stack. That is, in the fuel cell system according to the present disclosure, the pressure of hydrogen required in the stack may be variably set according to temperature, current, and other conditions of the stack.

Accordingly, in this step, when the amount of electric current to be generated in the stack is calculated, the hydrogen is supplied to the stack at a target hydrogen supply pressure according to the amount of electric current (S101).

According to one embodiment of the present disclosure, a hydrogen concentration at the outlet of the hydrogen electrode may be measured directly by the concentration sensor, and according to another embodiment, the hydrogen concentration may be estimated by a concentration estimator provided in the fuel cell system.

In addition, when the stack is driven for a certain time so that the quantification of the nitrogen resulting from the crossover from the air electrode to the hydrogen electrode increases as described above, purging may be carried out according to one embodiment of the present disclosure. In the case of purging, it is possible to determine whether the hydrogen purge valve is opened or not by using the hydrogen concentration at the outlet of the hydrogen electrode or the amount of electric charge generated by driving the stack as barometers.

According to an embodiment of the present disclosure, whether or not hydrogen purging is carried out and the point of time thereof may be determined by using at least one of the hydrogen concentration at the outlet of the hydrogen electrode and/or an accumulated amount of electric charge generated in the stack. Specifically, when the hydrogen concentration at the outlet of the hydrogen electrode drops below a predetermined hydrogen concentration, or when the integrated amount of the electric charge generated by driving the stack exceeds a predetermined amount of accumulated electric charge, the hydrogen purge valve is opened so that the gas containing nitrogen and foreign substances in the hydrogen electrode may be purged out of the system. That is, according to the present disclosure, the hydrogen concentration at the hydrogen electrode or the accumulated amount of electric charge generated by driving the stack is calculated (S102), and the point of time when the purging is carried out at the hydrogen electrode is determined (S103) using the calculated hydrogen concentration at the outlet of the hydrogen electrode or the accumulated amount of electric charge generated at the stack.

The step of determining the point of time when the purging is carried out at the hydrogen electrode (S103) may be selectively included, in which a period of purging may be set as a predetermined value and it may be determined whether or not to reach the point of time when the purging is carried out according to the set period of purging. As shown in FIG. 3, in the step of determining the point of time to purge may be determined by the hydrogen concentration at the outlet of the hydrogen electrode or the accumulated amount of electric charge generated in the stack.

According to one embodiment of the present disclosure, the method of calculating a hydrogen concentration at the hydrogen electrode may be performed by directly measuring the hydrogen concentration when the concentration sensor is provided, and estimating the hydrogen concentration when the concentration estimator is provided. Preferably, the hydrogen concentration at the outlet of the hydrogen electrode may be measured or estimated. Further, in the present disclosure, when the concentration sensor or the concentration estimator is not provided, the hydrogen concentration of the hydrogen electrode may be estimated based on the map data previously set using factors including temperature of the stack and current.

When the point of time to purge is determined, the partial pressure of nitrogen resulting from the crossover from the air electrode to the hydrogen electrode may be calculated between the previous point of time and the new point of time. According to an embodiment of the present disclosure, the partial pressure of nitrogen may be measured by a concentration sensor or a concentration meter provided inside the stack. Further, according to another embodiment, the partial pressure of nitrogen resulting from the crossover may be calculated using a predetermined value that may be estimated from the crossover to the hydrogen electrode according to the operating conditions (pressure, temperature and generated current) of the stack.

Further, in consideration of the partial pressure of nitrogen resulting from the crossover, the target hydrogen supply pressure may be updated (S104). Specifically, at the point of time to purge or before reaching the point of time to purge, the target supply pressure of hydrogen to be supplied to the stack is reset in consideration of the partial pressure of the nitrogen resulting from the crossover, and the hydrogen is supplied according to the target hydrogen supply pressure reset. As a result, the hydrogen partial pressure at the hydrogen electrode may be kept constant. Specifically, according to one embodiment of the present disclosure, the target hydrogen supply pressure may be calculated by adding the required hydrogen pressure in the stack and the partial pressure of nitrogen resulting from the crossover within the stack between the previous point of time and the new point of time. Therefore, the target hydrogen supply pressure may be updated to the target hydrogen supply pressure that has been increased by the partial pressure of nitrogen resulting from the crossover.

According to another embodiment of the present disclosure, the target hydrogen supply pressure is variably set over time in consideration of the rate of increase in the partial pressure of nitrogen resulting from the crossover from the air electrode to the hydrogen electrode inside the stack, even if it is not the time to purge.

Further, according to another embodiment of the present disclosure, the target hydrogen supply pressure may be set in consideration of both the partial pressure of nitrogen resulting from the crossover from the air electrode to the hydrogen electrode and the rate of increase in the partial pressure of nitrogen between multiple points of time to purge.

In addition, according to another embodiment of the present disclosure, the target hydrogen supply pressure in the present disclosure may be determined by at least one of the partial pressure of nitrogen increased during one cycle while carrying out purging multiple times, the temperature of the stack, the current conditions required in the fuel cell system, hydrogen concentration of the hydrogen electrode, and the like. Further, the target hydrogen supply pressure determined by factors other than the partial pressure of nitrogen may be mapped through preset data.

Specifically, it is possible to build up previously mapped data as to how much the hydrogen pressure should be increased corresponding to the temperature of the stack, the current condition required in the fuel cell system, or the concentration of the hydrogen electrode, and finally determine the target hydrogen supply pressure in consideration of the increased partial pressure of nitrogen and the data.

Therefore, according to one embodiment of the present disclosure, the target hydrogen supply pressure is calculated by summing the pressure of hydrogen required in the stack and the correction pressure considering the increased nitrogen partial pressure at the hydrogen electrode resulting from the crossover and/or the rate of increases in the partial pressure of the nitrogen.

Referring again to FIG. 3, it is determined whether or not to reach the point of time to purge (S105), and the purge is performed according to the determination result. Then, the accumulated amount of charge and the updated target hydrogen supply pressure may be reset during one cycle between one time to purge and next time to purge (S106). That is, after the purge is performed, the amount of charge required in the stack may be calculated again, and the accumulated charge amount may also be reduced to '0' or a preset default value.

According to an embodiment of the present disclosure, after the purge is performed, the method returns to the step of calculating a value of current required in the stack to determine the amount of hydrogen to be supplied to the stack and the pressure of hydrogen corresponding thereto. Thereafter, it is possible to perform the step (S102) of accumulatively measuring the hydrogen concentration at the outlet of the hydrogen electrode (fuel electrode) and the accumulated amount of current generated in the stack repeatedly over a predetermined period. If the point of time to purge is determined, the target hydrogen supply pressure may be updated (S104) according to method described above.

FIG. 4 is a graph showing the partial pressure of hydrogen, the purging period, and the pressure of the stack according to an embodiment of the present disclosure. The graph shown at the upper part of FIG. 4 shows the pressure of the fuel cell stack and the partial pressure of hydrogen according to purging multiple times.

Referring to a graph shown in a lower part of FIG. 4, according to one embodiment of the present disclosure, as the target hydrogen pressure supplied is increased, the rate of decrease in the hydrogen concentration at the outlet of hydrogen electrode is relatively reduced while the hydrogen partial pressure is kept constant, whereby there is an advantage in that the purging period of hydrogen is substantially increased.

FIGS. 5 to 7 are graphs showing the hydrogen concentration at the outlet of the hydrogen electrode, the partial pressure of nitrogen, and the partial pressure of hydrogen according to the degree of increasing the target supply pressure of hydrogen supplied to the stack.

FIG. 5 is a graph showing a state in which the partial pressure of nitrogen resulting from the crossover is caused, but the partial pressure is not considered, FIG. 6 is a graph showing a state in which a hydrogen partial pressure at a hydrogen electrode is kept constant in consideration of the partial pressure of nitrogen resulting from crossover and/or the operating condition (current, temperature) of the stack, and FIG. 7 is a graph showing when the target hydrogen supply pressure is increased excessively more than the case of FIG. 6.

Comparing FIGS. 5 to 7 with each other, as shown in FIG. 5, when not considering the partial pressure of nitrogen resulting from the crossover, hydrogen is exhausted by purging so that the partial pressure of the hydrogen is decreased, thereby reducing the efficiency of the stack. On the contrary, as shown in FIG. 7, when the hydrogen partial pressure at the hydrogen electrode is increased by excessively increasing the pressure of the supplied hydrogen, the amount of hydrogen loss due to exhaustion to the outside during purging may increase, which is inefficient in driving the stack. Therefore, as shown in FIG. 6, it is the most efficient in operating the stack that the hydrogen partial pressure at the hydrogen electrode is kept constant in consideration of various variables (the temperature of the stack, the operating condition, and the supply pressure of hydrogen) including the partial pressure of nitrogen resulting from the crossover.

To summarize, the key idea of the present disclosure is that, in purging multiple times, the target hydrogen supply pressure is updated by adding the partial pressure of nitrogen resulting from the crossover from the air electrode to the hydrogen electrode in the stack for one cycle between two purging, to the pressure of hydrogen supplied to the stack, and therefore the hydrogen partial pressure may be kept constant despite of purging in the stack. Particularly, it should be noted that the present disclosure is provided such that the target hydrogen supply pressure may be set by adding the value computed from the map data preset according to the conditions of the stack such as temperature and current, to the required hydrogen pressure in the stack, considering the fact that change of hydrogen concentration at the hydrogen electrode or amount of hydrogen discharged may vary depending on the purge condition and the environment of the fuel cell system, and Further the hydrogen target supply pressure may be variably controlled.

While the present disclosure has been particularly shown and described with reference to exemplary embodiments thereof, it will be understood by those skilled in the art that various changes and modifications such as addition, change, or deletion of constituent elements may be made therein without departing from the spirit and scope of the disclosure as defined in the appended claims, and such changes and modifications are included in the scope of the present disclosure.

In the following description, well-known functions or constructions are not described in detail to avoid unnecessarily obscuring the subject matter of the present disclosure. The terms used in the above description are defined in consideration of the functions in the embodiments of the present disclosure, which may vary depending on the intention of the user, the operator, or the custom. Therefore, the definition thereof should be based on the contents throughout this specification. Consequently, the detailed description of the disclosure should not be construed as limiting the disclosure to the disclosed embodiments, and the appended claims should be construed as including other embodiments.

What is claimed is:

1. A method of controlling a stack in a fuel cell system, the stack including a hydrogen electrode and an air electrode, the method comprising:
supplying, by a hydrogen supplier device, hydrogen from a hydrogen tank to the stack at a target hydrogen supply pressure;
computing, by a controller including a concentration estimator, a hydrogen concentration at an outlet of the hydrogen electrode or an accumulated amount of electric charge generated in the stack;
updating, by the controller, the target hydrogen supply pressure of the hydrogen supplied to the stack; and
operating, by the controller, the stack at the updated target hydrogen supply pressure,
wherein the updated target hydrogen supply pressure is set in consideration of the target hydrogen supply pressure and a partial pressure of nitrogen resulting from crossover in the stack, and
wherein the updated target hydrogen supply pressure is set, by the controller, by adding the partial pressure of the nitrogen resulting from crossover in the stack to the target hydrogen supply pressure in the stack, and the supplying hydrogen to the stack is performed at the updated target hydrogen supply pressure at a point of time to purge or before reaching the point of time to purge, such that the hydrogen partial pressure at the hydrogen electrode is kept constant,
wherein the updated target hydrogen supply pressure is variably set over time in consideration of a rate of increase in the partial pressure of the nitrogen.

2. The method according to claim 1, further comprising: determining to carry out a purge of the hydrogen electrode when the hydrogen concentration at an outlet of the hydrogen electrode exceeds a predetermined hydrogen concentration or the accumulated amount of electric charge generated in the stack exceeds a predetermined target amount of electric charge.

3. The method according to claim 1, wherein the target hydrogen supply pressure is set in consideration of the partial pressure of the nitrogen and at least one of temperature of the stack, condition of current required in the fuel cell system, and the hydrogen concentration in the hydrogen electrode.

4. The method according to claim 3, wherein the hydrogen concentration is directly measured by a concentration sensor in the stack or determined by using a value estimated via a concentration estimator.

5. The method according to claim 3, wherein the target hydrogen supply pressure determined by the temperature of the stack, the condition of current required in the fuel cell system, and the hydrogen concentration in the hydrogen electrode is mapped through preset data.

6. A method of controlling a stack in a fuel cell system, the stack including a hydrogen electrode and an air electrode, the method comprising:
supplying, by a hydrogen supplier device, hydrogen from a hydrogen tank to the stack at a target hydrogen supply pressure;
computing, by a controller including a concentration estimator, a hydrogen concentration at an outlet of the hydrogen electrode or an accumulated amount of electric charge generated in the stack; and
updating, by the controller, the target hydrogen supply pressure of the hydrogen supplied to the stack,
wherein the updated target hydrogen supply pressure is set in consideration of the target hydrogen supply pressure and a partial pressure of nitrogen resulting from crossover in the stack, wherein the target hydrogen supply pressure is updated to the updated target hydrogen supply pressure that has been increased by the partial pressure of nitrogen resulting from the crossover in the stack, and the supplying hydrogen to the stack is performed at the updated target hydrogen supply pressure at a point of time to purge or before reaching the point of time to purge, such that the hydrogen partial pressure at the hydrogen electrode is kept constant, wherein the updated target hydrogen supply pressure is variably set over time in consideration of a rate of increase in the partial pressure of the nitrogen.

* * * * *